United States Patent [19]

Herz

[11] 4,361,588
[45] Nov. 30, 1982

[54] FABRICATED FOOD PRODUCTS FROM TEXTURED PROTEIN PARTICLES

[75] Inventor: Jack L. Herz, Weston, Conn.

[73] Assignee: Nutrisearch Company, Cincinnati, Ohio

[21] Appl. No.: 173,564

[22] Filed: Jul. 30, 1980

[51] Int. Cl.$^3$ .................... A23J 3/02; A23L 1/34
[52] U.S. Cl. .................... 426/104; 426/274; 426/574; 426/583; 426/656; 426/657; 426/512; 426/516; 426/802
[58] Field of Search ............ 426/104, 274, 574, 583, 426/656, 657, 802, 512, 516

[56] References Cited

U.S. PATENT DOCUMENTS

| | | | |
|---|---|---|---|
| 3,939,284 | 2/1976 | Akin et al. | 426/802 X |
| 4,000,323 | 12/1976 | Youngquist | 426/802 X |
| 4,029,825 | 6/1977 | Chang | 426/583 X |
| 4,125,630 | 11/1978 | Orthoefer | 426/104 |
| 4,214,010 | 7/1980 | Corbett | 426/583 X |
| 4,218,490 | 8/1980 | Phillips et al. | 426/574 X |
| 4,226,890 | 10/1980 | Howard | 426/802 X |

Primary Examiner—Robert A. Yoncoskie
Attorney, Agent, or Firm—Cushman, Darby & Cushman

[57] ABSTRACT

A fabricated food product is prepared by shaping a blend of edible textured protein particles, including single cell protein, bound together with a whey protein concentrate composition having more than 30% protein which is capable of forming a gel at 15% solids within 30 minutes when heated at 85° C., wherein at least 50% of the protein in the whey protein concentrate is whey protein prepared by physical separation techniques.

19 Claims, No Drawings

FABRICATED FOOD PRODUCTS FROM TEXTURED PROTEIN PARTICLES

BACKGROUND OF THE INVENTION

The present invention relates to textured protein products, particularly meat analog fabricated food products prepared from food products formed from texturized protein.

In the past, much work has been done to provide satisfactory meat analog or simulated meats, from texturized protein particles.

A variety of prior art processes are known for "texturizing" vegetable protein, i.e., imparting to vegetable protein the chewy toughness and mouth-feel associated with meat, and assembling the texturized protein into familiar meat forms to provide meat analog products. For example, meat analog products can be made by processes involving fiber spinning or thermal plastic extrusion.

Fibrous textured protein products are prepared from proteins such as soy protein by forming a spinning solution from alkali solubilized protein and extruding the solution through a perforated die (spinnerette) into an acid (isoelectric) precipitating bath. The acidic bath sets the filaments or fibers as they emerge from the spinnerette. Thereafter, the fibers are collected for subsequent processing. The fibers, during the collection process, are usually stretched to orient the molecular structure of the fibers; thereafter, the fibers are assembled in "tows", bundles of individual fibers aligned in parallel fashion. Binding agents, coloring, fat and flavor can be added to the fiber tows and the entire fiber mass shaped to resemble familiar meat products. Details regarding the techniques are disclosed, for example, in U.S. Pat. Nos. 2,682,466, granted June 29, 1954 to Boyer; and 3,482,998, granted Dec. 9, 1969 to Carroll et al.

The thermal plastic extrusion process involves preparing a mixture of protein material, water, flavor and other ingredients and thereafter feeding the mixture into a cooker extruder wherein it is subjected to heat and pressure and subsequently extruded. The extrudate filament enters into a medium of reduced pressure (usually atmospheric) and expands to form a fibrous cellular structure. On rehydration, the fibrous filamentary texturized protein product can possess good appearance, bite and mouth feel. Details regarding thermal plastic extrusion techniques for the forming of textured protein meat analogs are disclosed, for example, in U.S. Pat. Nos. 3,488,770, granted Jan. 6, 1970 to Atkinson; and 3,496,858, granted Feb. 24, 1970 to Jenkins. With suitable binders, products similar to hamburger patties, meatballs, meat loaves and meat chunks can be formed. A variety of other processes are known for providing very suitable texturized proteins.

Textured proteins are generally obtained in the form of fiber pieces, fibrous extrudate filaments, or granules. These proteins must be bound together to form shaped meat or fish analog products, for example, beef chunk analogs, chicken analogs, hamburger patty analogs, meat loaf analogs and fish filet analogues. To hold proteins together, a suitable binder is required. To be acceptable, a suitable binder must present a reasonable bland or meat-compatible taste, bind effectively, heat set under mild conditions which will not adversely affect the protein particles. It must provide a product with an acceptable texture and mouthfeel when heat-set.

In the past, suitable binding materials for meat or fish analog products and natural extended meat products such as meat loaves and croquettes have included egg white. Egg white can be an excellent binding material, but the supply of egg white is limited and the cost is high. Attempts have been made heretofore to replace a portion of the egg white as the binding material in meat analog products. For example, U.S. Pat. No. 3,343,963, granted Sept. 26, 1967, to Kjelson discloses a three-component binder system comprising albumen, gluten and particulate defatted oilseed material; and U.S. Pat. No. 3,594,192, granted July 20, 1971 to Mullen et al., discloses a binder comprising egg white and a modified soy protein. Modified by treating soybean protein by raising this and on an aqueous dispersion of soybean protein to above about pH 9 and then reducing the pH to 5.5 to 8. While the treated soybean protein may exhibit improved binding properties, it is not a suitable binder as such. This binder still requires the presence of egg white.

There have been some fermentation based protein products, which when produced, are formed into long string-like masses by the microorganism itself. However, these materials must also be bound together with a binder in order to form useful fabricated food products.

Microbial cellular protein such as bacteria, yeasts, fungi and algae are rich in protein. Typical of the bio-synthetic processes for cultivating microorganisms, such as yeast, molds and bacteria, is the process described in U.S. Pat. No. 3,271,266 wherein microorganisms are grown in the presence of a petroleum fraction containing straight chain hydrocarbons, an aqueous nutrient medium and a gas containing free oxygen. Other suitable processes for the bio-synthetic production of microorganisms include the cultivation processes described in U.S. Pat. Nos. 3,268,413 and 3,384,491. The biosynthesis of protein, while providing a promising food source, has not become commercially acceptable in preparing protein for human consumption. One of the main reasons for lack of acceptance is the lack of texture inherent in these protein products. Single cell protein is generally produced as a wet paste and then dried. The dry powder, a flour-like material, lacks the texture and mouth feel necessary to make it an attractive food product. Further, when placed in water, the single cell protein becomes rapidly dispersed into single cells. Because of the extremely small particle size of the single cell protein (0.2–10 microns), the problem of texturizing these proteins cannot be easily overcome.

It would be desirable to provide a material which can be used to bind texturized protein or single cell protein which is available from an abundant source, has good nutrition, and flavor in addition to providing good binding as evidenced by good mouth feel and texture.

SUMMARY OF THE INVENTION

In accordance with the present invention, a fabricated food product can be prepared by shaping a blend of a major proportion of edible protein particles, including texturized protein and single cell protein and, as a total or partial bonding agent therefor, a whey protein concentrate composition having more than 30% protein which composition is capable of forming a gel at 50% solids within 30 minutes after being heated at 85° C. wherein at least 50% of the protein in the whey protein concentrate composition is whey protein separated from whey by physical separation techniques.

DETAILED DESCRIPTION OF THE INVENTION

As used herein, the term "edible protein particles" is intended to include texturized animal and vegetable protein, single cell protein, and polycellular protein.

The term "texture", is used herein to refer to a rigid mass, or flexible mass, of individual cells which can be readily formed into various sizes, shapes and configurations and which is non-dispersible in water.

The term "shaping" as used herein refers to and includes any physical operation, such as slicing, chopping, extruding, pressing, molding, or the like, which causes products to conform to a particular configuration.

Suitable particulate textured protein materials for use herein can consist of from 30% to 100% protein, on a dry weight basis, and from 0% to 70% materials associated with the protein source material or added adjuvant materials. Examples of adjuvant materials are carbohydrates, vitamins, and flavors etc. Preferably, the protein particles consist of 50% to 100% protein, and most preferably 50% to 80% protein on a dry weight basis.

The size and shape of the particulate textured protein material is not a critical aspect of this invention and can be selected to achieve the product characteristics desired. The particulate protein material is preferably fibrous since this protein material can be formed into very desirable fibrous meat analog food products.

Meat is an example of textured protein material. It is important to note, however, that proteins which are not textured can be texturized to form textured protein. These texturized proteins are preferred for use herein.

Suitable untextured proteins which can be texturized to form textured particulate protein materials are available from a variety of sources. The preferred source of such proteins is vegetable protein and certain fungal proteins; however, animal protein can be employed. Examples of suitable animal proteins are casein and egg white. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example if the protein source is soybeans, the soybeans can be dehulled and solvent extracted, preferably with hexane, to remove the oil therefrom. The resulting oil-free soybean meal contains about 50% protein.

The soybean meal can be processed in a known manner to remove carbohydrates and obtain products with higher levels of protein, for example, soy protein concentrates containing about 70% protein or soy protein isolates containing about 90% or more protein. In turn, a variety of suitable prior art processes can be employed to convert the soybean meal, concentrate, isolate and other edible protein bearing materials into suitable texturized particulate protein materials.

Suitable methods for converting untextured animal and vegetable protein bearing materials into particulate textured proteins are disclosed, for example, in the following U.S. Pat. Nos. 2,682,466, granted June 29, 1954, to Boyer; 3,142,571, granted July 28, 1964, to Kitchel; 3,488,770, granted Jan. 6, 1970, to Atkinson; 3,498,794, granted Mar. 3, 1970, to Calvert et al; 3,759,715, granted Sept. 18, 1973, to Loepiktie et al.; 3,778,522, granted Dec. 11, 1973, to Strommer; 3,794,731, granted Feb. 26, 1974, to Dannert et al.; 3,814,823, granted June 4, 1974, to Yang et al.; and commonly assigned U.S. patent application Ser. No. 248,581, filed Apr. 28, 1972, now U.S. Pat. No. 3,840,679, granted Oct. 8, 1974 to Liepa et al.; all said patents being incorporated herein by reference.

The most suitable particulate textured proteins are protein fibers with a cross-section of from about 20 to about 500 microns. The fibers can be in form of a fiber bundle (tow) comprised of numerous fibrous filaments having a substantially larger cross-section. Especially suitable particulate proteins are fibrous cellular texturized proteins formed by expansion, for example, texturized proteins formed by extrusion as mentioned hereinbefore.

In forming many desirable food products within the scope of this invention, it will be preferred to use particulate textured protein materials which have physical characteristics which meet proposed USDA-FNS specification for textured meat alternatives set forth in the Federal Register, Vol. 39, p. 11,297, dated Mar. 27, 1974.

The invention is also designed to provide a method for imparting texture characteristics and properties to protein-containing microorganisms such as that grown by known commercial fermentation processes. The cell harvest from a commercial fermentor, as for example the crude, moisture-containing product cake recovered from a centrifuge or filter, serves as a suitable starting material.

Any microbial cell material, however, can be treated according to the process of this invention. In a fully integrated, continuous system, the microbial cells are conveniently grown in a first fermentation stage where oxygen and a suitable substrate such as liquid or gaseous hydrocarbons or oxygen containing derivatives of hydrocarbons or carbohydrates together with a nutrient solution containing vitamins and minerals are fed to a stirred reactor containing microorganisms. The growth rate of microorganisms on the hydrocarbon or other substrate is typically exponential. As the microorganism concentration increases, a portion of the reaction mixture is withdrawn from the stirred reactor and the microorganisms separated from the withdrawn reaction mixture. Included among the various processes suitable for preparing starting materials used in the practice of this invention are the processes described in U.S. Pat. Nos. 3,384,491; 3,271,266; and 3,268,413.

Microorganisms are intended to cover single cell protein as well as polycellular proteins which are a plurality of individual microbial cells in an interconnected cellular state wherein a sufficient number of intercellular bonds are formed between individual cells to cause or resist in the ability of the combined mass of cells to revert back to individual cells. Polycellurization is analogous to polymerization on the molecular scale.

By way of illustration, bacteria such as those listed in Table I, yeasts such as those listed in Table II, and fungi such as those listed in Table III are suitable microorganisms for use as starting materials in the practice of this invention.

TABLE I

| SUITABLE BACTERIA: | |
|---|---|
| Acetobacter sp. | Corynebacteria sp. |
| Arthrobacter sp. | Micrococcus sp. |

TABLE I-continued

SUITABLE BACTERIA:

| | |
|---|---|
| Bacillus subtilus | Pseudomonas sp. |

TABLE II

SUITABLE YEASTS:

| | |
|---|---|
| Candida curvata | Saccharomyces fragilis |
| Candida lipolytica | Trichosporon cutaneum |
| Candida pulcherima | Saccharomyces cerevisiae |
| Candida utilis | Candida parapsilosis |
| Hansenula anomala | Hansenula wickerhamii |
| Hansenula miso | Pichia pastoris |
| Oidium lactis | Pichia haplophyla |
| Saccharomyces carlsbergensis | |

TABLE III

SUITABLE FUNGI

| (A = Aspergillus) | (P = Penicillium) |
|---|---|
| A. niger | A. itaconicus |
| A. glaucus | P. notatum |
| A. oryzae | P. chrysogenum |
| A. flavus | P. glaucum |
| A. terreus | P. griseofulvum |

The use of *Candida utilis, Saccharomyces cerevisiae, Saccharomyces fragilis* and *Saccharomyces carlsbergensis* are preferred starting materials for the process of this invention, however, because each is F.D.A. approved for use in food products.

The whey protein concentrate composition used in the invention contains at least 30% protein of which at least 50% must be whey protein. The remainder can be derived from other protein sources including dairy proteins, animal proteins and vegetable proteins.

The whey protein concentrate composition must be capable of forming a gel at 15% solids in water within about 30 minutes when heated to 85° C. The percent solids is based on the total solids added by the whey protein composition. A gel is formed when the mass becomes substantially non-pourable and capable of maintaining a shape. The whey protein concentrate composition must be able to form a gel at approximately the same pH as the system in which it is used, i.e., a pH above 5.5. For effective gelation, the whey protein concentrate composition must be substantially soluble or swellable at the pH at which it is used.

The whey protein concentrate used in the invention can be derived from either acid whey or sweet whey though acid whey is a desired source. Acid whey is the byproduct obtained from the acid coagulation of milk protein by the use of a lactic acid producing bacteria or by the direct addition of a food grade acid. In either case, acidification generally proceeds until a pH of approximately 4.6 is reached. At this pH, casein becomes insolubilized and coagulates as cheese curd. The cheese commonly produced by this manner is called cottage cheese. The whey obtained is a byproduct from this method is called "acid" or "cottage cheese whey" or "casein whey".

The whey can also be derived from the production of cheddar cheese, which is commonly produced by the rennet coagulation of protein. This cheese whey is commonly called "sweet" or "cheddar cheese whey". Wheys from other cheeses which are either acid or sweet can also be used as the source of the whey protein.

The whey protein concentrate as used in the invention is more preferably derived from 100% acid cheese whey though less than 50% and preferably less than 20% by weight of the other cheese wheys can be used.

Whey protein concentrate is defined as any whey product having more than 30% by weight protein (dry basis) which is prepared by physical rather than chemical separation techniques. Physical processes which can be utilized to prepare whey protein concentrates include electrodialysis, which may be preceded or followed by partial lactose removal, (Stribley, R. C., Food Processing, Vol. 24, No. 1, page 49, 1963), Reverse Osmosis (Marshall, P. G. et al., Fractionation and Concentration of Whey By Reverse Osmosis, Food Technology 22(a) 696, 1968, Gel Filtration (U.S. Reissue Pat. No. 27,806), and Ultrafiltration, Horton, B. S. et al., Food Technology, Volume 26, page 30, 1972 and ion exchange in deference to chemical methods such as phosphate precipitation as described in U.S. Pat. Nos. 2,388,624 and 4,043,990 as well as sodium lauryl sulfate precipitation as described in U.S. Pat. Nos. 4,029,825 and 4,058,510.

It has been found that the most effective results have been obtained using an ultrafiltered acid whey protein concentrate containing at least about 40% whey protein. In a typical process, cottage cheese whey is neutralized to a pH of about 6.4 with 50% caustic. After storage, the pH is then adjusted to about 7.2 and any solids or precipitates are removed by centrifugal clarification. The clarified liquor, after pasteurization, is fed into an ultra-filtration membrane unit. The retentate is condensed and spray dried. Protein products of 35% by weight (dry basis) or more whey protein are efficiently prepared by this process. One of the more preferred products prepared by this process generally comprises from about 40% to about 60% whey protein based on Total Kjeldahl Nitrogen, 10–30% lactose, 3–15% ash and 0.1–4% fat. It is preferred to use a product in a dry form to avoid the need for refrigeration though a liquid whey protein concentrate can also be used.

It is particularly preferred to utilize, as the whey protein concentrate, a product which has been treated to reduce the thermal gelation temperature such as by the treatment of the protein with sulfite and preferably, in accordance with the method disclosed in Ser. No. 95,684, filed Nov. 19, 1979, the disclosure of which is incorporated herein by reference. The process as described in this copending application comprises cooling a heated alkaline protein containing solution having a total protein content of less than about 20% by weight of the solution wherein the pH is within the range of from about 8 to about 10 from a temperature within the range of from about 50° C. to the gelation temperature of the protein and cooling to a temperature sufficiently low and within a sufficient amount of time after the solution reaches its maximum temperature level to prevent any substantial further change in the protein structure. The pH of the material is preferably reduced to neutral (6–8) simultaneously with, or subsequent to cooling.

Preferred form of the process described in the copending application comprises the steps of (a) preparing a solution of whey protein in water at a temperature of less than about 30° C. at between 0.5% and 20% by weight total protein content wherein the pH of the solution is within the range of from about 8 to about 10; (b) heating the alkaline solution to a temperature within the range of from about 50° C. to about 80° C.; (c) cooling to a temperature below 30° C. and above 2° C. within at least 60 minutes after reaching the elevated temperature at a rate sufficient to prevent any further substantial change in the protein structure; and (d) adjusting the pH below pH 8 and preferably within the range of from about 6 to 8. Cooling is generally initiated within one hour and preferably within 30 minutes after the temperature of the solution has reached its maximum level. Cooling is conducted at a rate sufficient to prevent any further substantial change in the protein and to avoid gelation of the protein containing solution.

The protein, which can be treated by the preferred process, is that protein which is substantially soluble at an alkaline pH of between 8 and 10. Substantial amounts of insoluble protein while generally having no adverse effect on the protein during processing, can affect the gel strength of later formed gels. It is preferable that the protein from the protein source be at least 50% by weight soluble and preferably at least 75% and more preferably at least 100% soluble at the alkaline pH of the process. The major protein (at least 50% by weight protein) for use in the aforementioned process is preferably any whey protein concentrate though the material can contain minor amounts of protein from other sources including dairy such as milk and whey by-products and whey, vegetable such as soy, cottonseed, peanut and the like vegetables, soluble meat proteins such as those obtained from red meat, poultry and fish as well as egg and blood albumens. Preferably, the whey protein material which is treated is a whey protein concentrate provided by the processes previously discussed. The whey protein concentrate should contain at least 30% by weight (dry basis) and preferably from about 40% to about 60% protein based on Total Kjeldahl Nitrogen. Processing which substantially denatures the whey protein such as high heat, strong chemicals and electrodialysis under extreme conditions should be avoided. It has been found that the most effective results obtained using an ultrafiltered acid whey concentrate containing from about 40% to about 60% by weight (dry basis) protein. The process for obtaining such a product has been previously described as well as its composition.

The whey protein containing solution to be treated by the process disclosed in copending application Ser. No. 95,684 does not require a minimum amount of protein for effective treatment. It is preferred not to use a whey protein solution having more than about 20% by weight protein in solution. The protein containing solution can be obtained by the use of an existing whey protein concentrate solution or by rehydrating a dried product in water. The pH is then adjusted to a range of from about 8 to about 10, preferably for whey proteins (dairy) from about 9 to about 10, with most effective results being achieved at about 9.5. Any food grade alkalizing agent such as sodium or potassium hydroxide and preferably sodium hydroxide can be used. Other methods of elevating the pH such as by the use of an anionic/cationic exchange resin can be used. Sufficient agitation is utilized to avoid localization of high pH.

The alkaline whey solution is then heated to a temperature within the range of from about 50° C. to about 80° C., the temperature being elevated as fast as possible without causing protein insolubilization. The maximum heating time is the gelation point of the protein. The heating time is preferably not over a maximum of about 1 hour and more preferably less than about 30 minutes, and most preferably less than about 15 minutes, depending on the temperature of processing. High temperature, short time pasteurization processing equipment can be effectively used for heating and cooling. After alkalization and heating, the product is cooled within a period of about 15 minutes to reduce the temperature below that at which further change in protein structure occurs and preferably to room temperature. Cooling must be initiated after the protein has been treated and before substantial gelation has occurred. The higher the temperature achieved, the greater the rate required for the cooling. Subsequent to the cooling, the pH is adjusted to a range of from about 6 to about 8 and preferably from about 6.5 to about 7.5 with any food grade acid. Sufficient agitation should be utilized to avoid localized conditions of acid build-up. The acid can be added during the cooling step if desired.

The neutralized product can be used as is, concentrated and/or dried. Effective material handling conditions should be observed to avoid spoilage and contamination of the product depending on its physical form.

The whey protein concentrate can be treated along with alternate protein sources. In general, processing conditions for the protein with the lowest activity point should be used. For instance, egg albumen and whey protein concentrate can be processed advantageously together. Blends of about 50% by weight whey protein concentrate and about 50% by weight (dry basis) egg albumen and preferably from about 75% to about 100% whey protein concentrate and from about 25% to about 0% egg albumen can be effectively processed together. The percentages are by weight based on the dry solids weight of the whey protein concentrate and the albumen. Processing times for blends are disclosed in Ser. No. 95,684.

The product prepared by the process of Ser. No. 95,684 or whey protein concentrates in general can be used in amounts of at least 50% by weight and more preferably at least 75% and most preferably 100% whey protein concentrate including modified whey protein concentrate with the remaining protein comprising blends of other proteins modified by the process of 95,684 or non-modified proteins such as milk, alkali metal caseinates, unmodified whey proteins including dry whey, delactosed whey, delactosed demineralized whey, the dried permeate and delactosed permeate resulting from the ultrafiltration of whey, the precipitate prepared by neutralizing acid whey as disclosed in U.S. Pat. No. 4,036,999 and the precipitate prepared by adding calcium ion to sweet whey followed by neutralization as disclosed in U.S. Pat. No. 3,560,219 as well as the dried mother liquor remaining after separation of these precipitates, vegetable proteins such as soy proteins and soluble protein such as egg albumen and blood albumen whole egg and soy yolk. The use of these materials is dependent on the gel formation and hence the water solubility thereof. The soy protein should be treated to remove the soy taste or the amount of soy protein should be limited to avoid introducing a beany taste into the product.

These blends of protein can be made by dry blending or codrying of the liquid blend. When using a modified whey protein concentrate, only a small amount of additional unmodified protein, i.e., less than 25% is recommended to avoid diluting the effects of the modified protein.

While the product can be dried effectively by itself, it is also contemplated to codry the products with drying agents and other functional ingredients, i.e., gums, starch, sugars, stabilizers, flavoring and bulking agents, emulsifiers and the like materials.

The edible protein particles can be coated or blended with the bonding agent by a variety of known techniques illustrated by spraying or metering as well as bath immersion. Preferably, the particular protein material to be coated with the bonding agent is hydrated with 1 to 3 times its dry weight with water. While it is preferred that both the particular protein and the bonding agent be moistened prior to mixing, the materials can be mixed together dry prior to adding the same to a liquid system.

The whey protein concentrate composition bonding agent, either alone or in combination with other bonding agents, is used in an amount sufficient to effectively bond together the particles in a gel-like matrix. The bonding agent can also be used in an amount above that needed for bonding if it is desired to use the whey protein concentrate composition as a filler. Since the bonding agent of the invention can be used as a partial bonding agent, the term "amount sufficient to effectively bond" is intended to include that amount needed to bond the particles together in combination with all other binders in the system. The particular amount of bonding agent most suitable for a particular product will vary somewhat with the product formulated. The bonding agent is preferably used in an amount of from about 5% and above. For practical purposes, the upper limit of the bonding agent is about 50%. Preferably, the upper limit is about 15% and most preferably the bonding agent utilized ranges from about 7.5% to about 12.5%. The percentage of bonding agent is on a dry basis based on the total dry weight of the particles and the whey protein concentrate composition before heat setting. The blends of the protein particles and the bonding agent can then be shaped into products resembling meat forms, such as bacon or in convenient forms such as rolls, loaves, balls, patties, chunks, or slabs. The shaping can be accomplished by hand or by the use of extruding techniques, suitable molds, forms, presses or converging conveyor belts using pressure and non-pressure modes. Preferably, the products can be shaped to resemble familiar meat products, for example, hamburger patties, meatballs, meat chunks or bacon.

The shaped articles are then further processed to set the formed shape as by drying and/or heat setting. Heat sets the protein such that it forms a gel firmly binding the protein particles together. In general, temperatures within the range of from about 70° C. to about 95° C. and preferably from about 70° C. to about 80° C. will suitably heat set the bonding agent. In some instances, the shaped article can be blanched or lightly cooked prior to other surface treatment. Light blanching may be preferred to set the outer surface and form a skin to set the shape before the final surface treatments are undertaken. Other agents, which are designed to assist in setting the shape, can be included in the shaped article. For instance, an alginate can be blended with the bonding agent and the shape set by applying a calcium salt to at least the surface (see U.S. Pat. No. 3,560,766). The final setting or shape can be accomplished by heat setting.

The time necessary to provide good heat setting at a particular temperature will vary depending on the type of whey product utilized and the thickness of the shaped article. A relatively thin article can generally be heat set in less than 30 minutes, particularly when using a whey protein concentrate that has been treated to lower the thermogelation temperature. Suitable heat setting temperatures can be obtained in a variety of operations including baking, frying, or microwaving the shaped product.

The resulting unitary shaped food product is a novel protein containing food product comprising a plurality of edible protein particles bound together by a heat set protein. The shaped product can be frozen or dehydrated and stored for later use.

The food products of this invention often contain additional ingredients to impart desirable taste and appearance characteristics to the product. Such other edible ingredients include flavoring agents, coloring agents, oils and fats, flavor enhancers, humectants, stabilizers, preservatives, and the like. For example, various meat flavors such as chicken or beef can be added. Synthetic ham, bacon, and sausage flavors may also be used. An edible emulsifier can also be employed to aid formation of an emulsion with the oil.

While the amount of additional ingredients in proportion to the bonding agent can vary over a wide range, the amount of these additional ingredients should not so dilute the bonding agent that it becomes ineffective.

As used herein, all percent protein are based on Total Kjeldahl Nitrogen (TKN) using the specific factor of 6.38 for dairy protein or other factors relevant to other protein systems.

The present invention will be illustrated further in the examples which follow.

It has also been found that egg white as well as egg white-whey protein concentrate blends can be treated in accordance with the method disclosed in Ser. No. 95,684 to provide a material which is effective in preparing the fabricated food products of the invention. The whey protein can range from 0% to 100%. This is intended to cover egg albumen alone as well as blends of egg albumen and varying amounts of whey protein concentrate up to and including the absence of egg white entirely.

EXAMPLE 1

The retentate from the ultrafiltration of acid whey containing about 50% protein on a dry solids basis was diluted with water from a total solids content of about 19% to a total solids content of about 18.4%. A sufficient amount of caustic was added to the diluted retentate to elevate the final pH from about 7 to about 9.2. The alkaline diluted retentate was heated in a pasteurizer to 78.9°-80.6° C. The hold time in the pasteurizer was 16-20 seconds. The heated product was cooled to 23.3° C. Phosphoric acid was added to the cooled product to lower the pH to about 7. The product was then spray dried.

A 15% solution of the modified whey protein concentrate as provided in this example when heated at 75° C. formed a gel within 30 minutes.

The modified whey protein concentrate product as used in the following examples had the following composition:

| | |
|---|---|
| Protein | about 50% |
| Carbohydrate | about 27% |
| Ash | about 8% |
| Fat | about 0.3% |
| Moisture | about 4% |
| pH | about 6.9% |

EXAMPLE 2

Casein/defatted soy fibers prepared as outlined in Food Processing Review No. 3, entitled Protein Food Supplements (Noyes Development Corporation, 1969) at page 316, the teachings of which are incorporated herein by reference are dipped into a bonding agent solution prepared by emulsifying 200 grams water, 70 grams of the product of Example 1, 100 grams hydrogenated cottonseed oil and flavor to suit (e.g., chicken flavor). The ratio of bonding agent to wet fiber is approximately 1:12. The fiber is heated in a covered pan for 30 minutes at 80°-90° C. The resulting product is anticipated to have good cohesiveness, texture and mouthfeel. It can be cut into chunks and dehydrated in a vacuum dryer.

What is claimed is:

1. A fabricated food product comprising a blend of a major proportion of edible protein particles and a bonding agent therefor, said bonding agent comprising a whey protein concentrate composition having 40 to 60% protein, said whey protein concentrate composition having a lowered gelation temperature and being prepared by a process comprising:
   (a) adjusting the pH of an aqueous solution of a whey protein concentrate having a temperature less than about 30° C. to a pH ranging from about 8 to about 10, said whey protein concentrate comprising a whey protein concentrate derived by ultrafiltration and having from about 40 to about 60 percent, by weight, on a dry solids basis of whey protein,
   (b) heating the pH adjusted solution of step (a) to a temperature ranging from about 50° C. to about 80° C., and
   (c) cooling said heated solution to a temperature below 30° C. and about 2° C. within at least 30 minutes after the said heated solution reaches its maximum temperature level, said cooling being conducted at a rate sufficient to prevent gelation of the whey protein containing solution.

2. The fabricated food product of claim 1 wherein said edible protein particles are texturized proteins.

3. The fabricated food product of claim 2 wherein said texturized protein is vegetable protein.

4. The fabricated food product of claim 3 wherein said vegetable protein is soy protein.

5. The fabricated food product of claim 1 wherein said edible protein particles are single cell proteins.

6. The fabricated food product of claim 1 wherein said bonding agent is present in said fabricated food product, prior to setting, in an amount ranging from about 5% to about 50% by weight, on a solids basis, based on the total weight of the unset fabricated food product.

7. The fabricated food product of claim 1 where in step (a) said whey protein concentrate comprises from about 75% to about 100% by weight of said whey protein concentrate derived by ultrafiltration and from about 25% to about 0% of another protein containing material.

8. The fabricated food product of claim 1 wherein said edible protein particles are texturized proteins and said bonding agent is present in an amount ranging from about 5% to about 50% by weight, on a solids basis, based on the total weight of the fabricated food product in the unset form.

9. The fabricated food product of claim 1 in a shaped form.

10. The fabricated food product of claim 1 in extruded form.

11. A process for preparing a shaped fabricated food product comprising (a) blending a major proportion of edible protein particles with a bonding agent, said bonding agent comprising a whey protein concentrate composition having 40–60% protein, said whey protein concentrate composition having a lowered gelation temperature and being prepared by a process comprising
   (i) adjusting the pH of an aqueous solution of a whey protein concentrate having a temperature less than about 30° C. to a pH ranging from about 8 to about 10, said whey protein concentrate comprising a whey protein concentrate derived by ultrafiltration and having from about 40 to about 60 percent, by weight, on a dry basis of whey protein,
   (ii) heating the pH adjusted solution of step (i) to a temperature ranging from about 50° C. to about 80° C., and
   (iii) cooling said heated solution to a temperature below 30° C. and above 2° C. within at least 30 minutes after the said heated solution reaches its maximum temperature level, said cooling being conducted at a rate sufficient to prevent gelation of the whey protein containing solution, and
   (b) forming said blend into a shaped fabricated food product.

12. The process of claim 11 wherein the shaped fabricated food product is set by elevated temperature.

13. The process of claim 11 wherein said edible protein particles are texturized protein particles.

14. The process of claim 13 wherein said texturized protein is vegetable protein.

15. The process of claim 11 wherein said edible protein particles are single cell proteins.

16. The process of claim 11 wherein said bonding agent is present in said fabricated food product, prior to setting, in an amount ranging from about 5% to about 50% by weight, on a solids basis, based on the total weight of said fabricated food product in the unset state.

17. The process of claim 11 where in step (i) the whey protein concentrate comprises about 75% to about 100% by weight of said whey protein concentrate derived by ultrafiltration and from about 25% to about 0% of another protein containing material.

18. The process of claim 11 wherein said edible protein particles are texturized proteins and said bonding agent is employed in an amount ranging from about 5% to about 50% by weight, on a solids basis, based on the total weight of the fabricated food product in the unset form.

19. The process of claim 11 wherein forming said blend into a shaped fabricated food product comprises extruding said blend.

* * * * *